May 7, 1957 H. H. LAUXMANN 2,791,303
CLUTCH
Filed Dec. 14, 1953
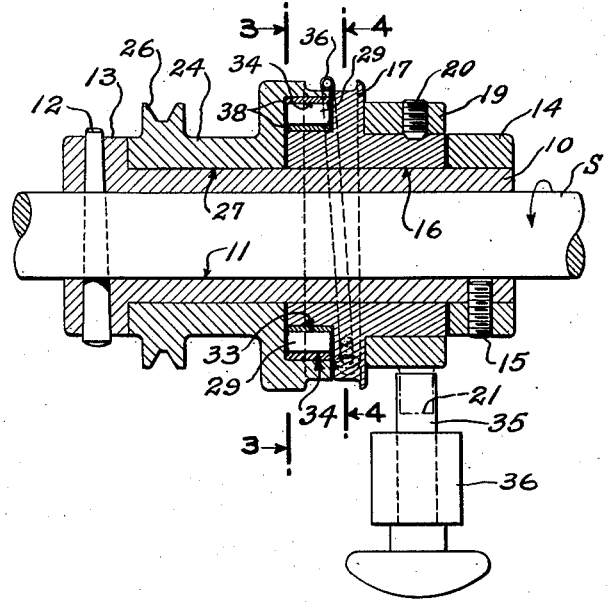
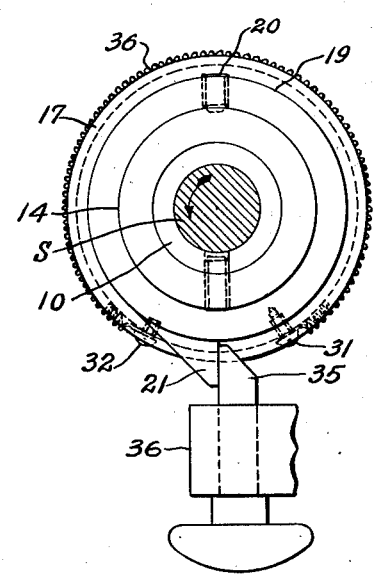
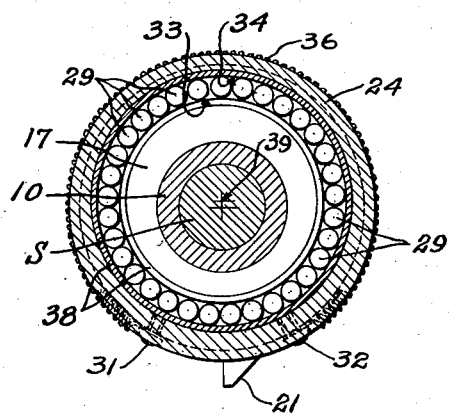
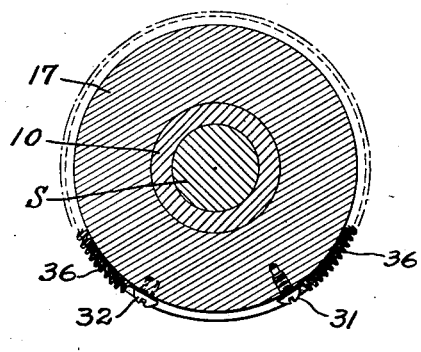
INVENTOR.
HANS H. LAUXMANN
BY
ATTORNEYS ns patent office 2,791,303
Patented May 7, 1957

2,791,303

CLUTCH

Hans H. Lauxmann, New York, N. Y., assignor to Hans Reichle, doing business as Putnam Specialties, Mahopac Falls, N. Y.

Application December 14, 1953, Serial No. 397,819

6 Claims. (Cl. 192—38)

The invention pertains to a clutch for driving a machine or other mechanism from a rotating part such as a drive shaft and the like. The clutch is of simple construction so that it may be economically manufactured yet is effective in establishing driving connection with the rotating part and releasing the clutch or driving connection whenever desired.

It is an object of the invention to construct a clutch which is of simple construction so that it may be economically manufactured and effective in operation.

Another object of the invention is to construct a clutch consisting of two members, each having surface which is eccentric to the axis of the bores of the members so that relative rotation of one with respect to the other eccentrically forces their axis out of alignment with respect to each other and the rotating part so that their bores grip the rotating part to provide a clutching action.

Other objects of the invention will be more apparent from the following description when taken with accompanying drawings illustrating a preferred embodiment thereof in which:

Figure 1 is a longitudinal section through the clutch mounted on a rotating shaft;

Figure 2 is an end view of the clutch;

Figure 3 is a cross section taken on line 3—3 of Figure 1; and

Figure 4 is a section taken on line 4—4 of Figure 1 showing the spring connection between the clutch members.

The clutch particularly illustrated is intended to be mounted upon a driving part shown as a driving shaft S although it may be mounted in connection with any rotating part. Preferably a bushing 10 is provided which has a hole 11 therethrough to receive the driving part or shaft which bushing is operatively connected with the shaft in any suitable manner, a pin 12 being illustrated extending through the bushing and the shaft so that the bushing in effect is a part of the shaft or driving part. The bushing carries a collar or flange 13 at one end thereof and a second collar 14 at the other end secured to the bushing by a screw 15. The inner faces of the collars form spaced abutments or shoulders.

The clutching members include a primary clutch member 17 having a bore 16 which receives the bushing 10 so that the member is rotatably mounted thereon and retained thereon by the collar 14. Any suitable means may be provided for stopping the rotation of the primary member as will appear more fully hereinafter, the means particularly shown including a collar 19 which is secured to the primary member such as by a screw 20 which collar carries a stop projection 21.

The clutch includes a secondary clutch member 24 having a bore 27 which receives the bushing 10 and rotatably mounts the member thereon. The secondary member carries any suitable driven means that illustrated being a belt pulley 26 to be connected by a belt to a machine or other mechanism to be driven by the shaft. The driven means may be a gear, belt, pulley or any other suitable means. The two clutch members are retained on the bushing and against axial separation by the spaced collars 13 and 14.

Circular bearing means is carried by the primary and secondary members to effect the clutching action. The bearing means includes an external circular bearing surface carried by one member and an internal bearing surface carried by the other. In the construction illustrated the external bearing surface 33 is carried by the primary member and the internal bearing surface 34 is carried by the secondary member. The surfaces may be provided by hardened wearing sleeves 38 as is known. The internal circular bearing surface 33 carried by the primary member is in radial alignment with the external bearing means 34. The external and internal bearing surfaces or their axes 39 are eccentric with respect to the axis of the bushing or driving shaft S but the eccentricity is the same for both surfaces. Preferably circular rolling members 29 are received between the internal and external bearing surfaces. Rollers are particularly shown although they may be balls having suitable bearing surfaces to receive the balls; however, with rollers the external and internal bearing surfaces are cylindrical surfaces.

Spring means shown particularly as a coil spring has one end thereof secured to the primary member such as by a screw 31 and the other end is secured to the secondary member by a screw 32 with the spring encircling the clutch members preferably in a groove. The spring means is under tension when the axes of the internal and external bearing surfaces are in alignment and the spring means pulls the primary in the direction of the rotation of the bushing or shaft whenever the primary member is released.

Any suitable means is provided to stop the rotation of the primary member and release the clutch. The means particularly illustrated includes the projection 21 carried by the primary member and a finger 35 carried by a frame 36 which is projected into the path of the projection 21 when it is desired to operate the clutch. The means to stop rotation of the primary member operates immediately and is merely illustrative of a simple form of means for this purpose.

The operation of the clutch will now be described. Assume that the finger 35 is engaging the projection 21 so that the primary member is held stationary. The friction between the bushing and the secondary member tends to rotate the latter relatively to the primary member in the direction of rotation of the shaft and bushing which rotation keeps the spring under tension and retains the axes 39 of the external and internal bearing surfaces in substantial alignment. In this relative position of the primary and secondary members, the two members permit free rotation of the bushing within their bores. If now the finger 35 is removed from engagement with the projection 21, the spring means 30 pulls the primary member relatively to the secondary member with the primary member turning in the direction of shaft rotation with the result that the internal eccentric bearing surface is moved out of concentricity with the external bearing surface. The rollers or circular rolling members 39 permit this relative rotation to take place freely, until they are jammed which forces the primary member in one direction radially and the secondary member in the other direction so that the bores of the primary and secondary members grip the bushing. If the load being transmitted through the clutch to the driven mechanism connected with the pulley 26 is heavy the jamming is increased to effect a stronger clutching of the members with the bushing. If it is desired to release the clutch, the finger 35 is projected into the path of the projection 21 which stops the rotation of the primary member bringing about relative rotation between the primary member and the secondary member to a position where the eccentric bearing surfaces have their axes in or substantially in alignment thereby releasing the gripping or jamming action of the members with the bushing.

It is clear that the bushing 10 may be dispensed with and the primary and secondary members mounted directly upon the shaft between collars equivalent to collars 13 and 14. It is preferable however to provide the bushing both to increase the rigidity and strength of the shaft at the clutch and also so that any wear as a consequence of the jamming action will be on the bushing rather than directly on the shaft.

The invention is presented to fill a need for improvements in a clutch. It is understood that various modifications in structure, as well as changes in mode of operation, assembly, and manner of use, may and often do occur to those skilled in the art, especially after benefitting from the teachings of an invention. Hence, it will be understood that this disclosure is illustrative of preferred means of embodying the invention in useful form by explaining the construction, operation and advantages thereof.

What is claimed is:

1. A clutch adapted to be mounted on a driving part comprising a primary clutch member having a bore for rotatably mounting the same on the driving part, driven means carried by the primary member, a secondary clutch member having a bore rotatably mounting the same adjacent to the primary clutch member on the driving part, the bores in the primary clutch member and the secondary clutch member being of the same diameter, an external circular bearing surface carried by one of the clutch members the center of which is eccentric to the axis of the bore of the clutch member, an internal circular bearing surface carried by the other clutch member the center of which is eccentric to the axis of the bore of the clutch member and of the same eccentricity as the external bearing surface, the circular bearing surfaces being in radial alignment, spring means connecting the primary and secondary members and being under tension when the bearing surfaces are concentric with each other, and means to stop rotation of the primary clutch member to release the clutch.

2. A clutch adapted to be mounted on a driving part comprising a primary clutch member having a bore for rotatably mounting the same on the driving part, driven means carried by the primary member, a secondary clutch member having a bore rotatably mounting the same adjacent to the primary clutch member on the driving part, the bores in the primary clutch member and the secondary clutch member being of the same diameter, an external circular bearing surface carried by one of the clutch members the center of which is eccentric to the axis of the bore of the clutch member, an internal circular bearing surface carried by the other clutch member the center of which is eccentric to the axis of the bore of the clutch member and of the same eccentricity as the external bearing surface, the circular bearing surfaces being in radial alignment, circular rolling members between the roller bearing surfaces, spring means connecting the primary and secondary members and being under tension when the bearing surfaces are concentric with each other, and means to stop rotation of the primary clutch member to release the clutch.

3. A clutch as in claim 2 in which the means to stop rotation of the primary clutch member is a projection carried thereby and means movable into engagement with the projection.

4. A clutch adapted to be mounted on a driving part comprising a cylindrical bushing of one diameter having a bore to receive the driving part and spaced collars, a primary clutch member having a bore for and rotatably mounted on the bushing between the spaced collars, a secondary clutch member having a bore for and rotatably mounted on the bushing adjacent to the primary clutch member and between the spaced collars, the bores in the primary clutch member and the secondary clutch member being of the same diameter, driven means carried by the secondary member, an external circular bearing means carried by one of the clutch members the center of which is eccentric to the axis of the bore of the bushing, an internal circular bearing means carried by the other clutch member the center of which is eccentric to the axis of the bore of the bushing and of the same eccentricity as the external circular bearing means, the two circular bearing means being in radial alignment, spring means connecting the primary and secondary clutch members and being under tension when the rolling bearing means are concentric with each other and pulling the primary clutch member in the direction of bushing rotation, and means to stop rotation of the primary clutch member to release the clutch.

5. A clutch adapted to be mounted on a driving part comprising a cylindrical bushing of one diameter having a bore to receive the driving part and spaced collars, a primary clutch member having a bore for and rotatably mounted on the bushing between the spaced collars, a secondary clutch member having a bore for and rotatably mounted on the bushing adjacent to the primary clutch member and between the spaced collars, the bores in the primary clutch member and the secondary clutch member being of the same diameter, driven means carried by the secondary member, an external circular bearing means carried by one of the clutch members the center of which is eccentric to the axis of the bore of the bushing, an internal circular bearing means carried by the other clutch member the center of which is eccentric to the axis of the bore of the bushing and of the same eccentricity as the external circular bearing means, the two circular bearing means being in radial alignment, circular rolling members between the internal and external circular bearing means, spring means connecting the primary and secondary clutch members and being under tension when the rolling bearing means are concentric with each other and pulling the primary clutch member in the direction of bushing rotation, and means to stop rotation of the primary clutch member to release the clutch.

6. A clutch as in claim 5 in which the means to stop rotation of the primary clutch member is a projection carried thereby, and means movable into engagement therewith.

References Cited in the file of this patent

UNITED STATES PATENTS

| | | |
|---|---|---|
| 906,181 | Zeitz | Dec. 8, 1908 |
| 1,061,048 | Clemencet | May 6, 1913 |
| 1,256,755 | White | Feb. 19, 1918 |

FOREIGN PATENTS

| | | |
|---|---|---|
| 552,923 | France | May 9, 1923 |